Nov. 22, 1966   W. J. BRAY, JR   3,287,290
SPRAY-DRIED VINYL ACETATE DIBUTYL MALENTE COPOLYMER, WITH
PIGMENT, THICKENER, DISPERSING AGENT AND PLASTICIZER
Filed Dec. 3, 1962
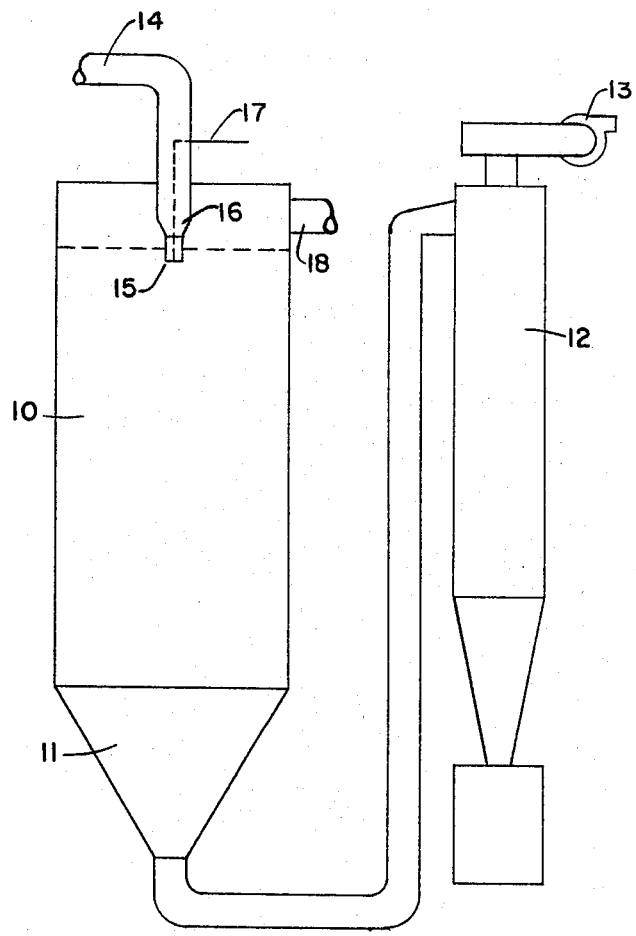
INVENTOR
WALTER J. BRAY, JR
BY
ATTORNEY

United States Patent Office 3,287,290
Patented Nov. 22, 1966

3,287,290
SPRAY-DRIED VINYL ACETATE DIBUTYL MALEATE COPOLYMER, WITH PIGMENT, THICKENER, DISPERSING AGENT AND PLASTICIZER
Walter J. Bray, Jr., Longmeadow, Mass., assignor, by mesne assignments, to Monsanto Company, a corporation of Delaware
Filed Dec. 3, 1962, Ser. No. 243,970
1 Claim. (Cl. 260—17)

The present case is a continuation-in-part of Serial Number 9,340 filed on February 17, 1960, and now abandoned.

The present invention pertains to spray-drying of aqueous dispersion paint compositions and products obtained thereby. More particularly, this invention pertains to the spray-drying of polyivnyl ester dispersion paints generally, including both the normally plasticized and the unplasticized types.

Dry powdered water-dispersible surface coating compositions are known. These compositions are obtained by mixing the solid constituents in dry form so as to yield a powder, which can when needed, be dispersed in water to form the liquid coating composition. More advantages result from the greater stability and decreased bulk of the dry coating composition.

Extensive commercialization of the water-dispersible dry paint compositions has not been realized, largely because the known composition do not yield products having properties as satisfactory as the available liquid compositions. To be more specific the known dry compositions when dispersed in water to form liquid paints do not have as good application properties as do the available liquid compositions nor are the final properties of the air-dried films from the former compositions as satisfactory. A major reason for poorer properties in liquid paints obtained from dry compositions is the absence of certain liquid agents normally contained in aqueous dispersion paints which impart excellent application and film properties. These agents are the well known plasticizers and coalescing agents, which are generally organic liquids having a solvation effect on the resin binder in the paint. The most efficient plasticizers and coalescing agents being liquid, if included in the dry composition in useful quantities would so agglomerate the dry powdered composition as to destroy or greatly reduce the water redispersibility of the mixture.

The applicant has found however, that by utilizing the method hereinafter disclosed, for the preparation of the dry powdered paint composition, that the polyvinyl ester binder normally employed for the preparation of liquid aqueous dispersion paints may be used along with plasticizers and/or coalescing agents, to form a readily water-dispersible dry powder product, essentially free from agglomeration.

It has further been found that the dry powdered paints of the present invention, when redispersed in liquid form and applied, will air-dry to yield films which have substantially improved brightness over like films obtained from the original liquid paint compositions. The compositions of the present invention are free-flowing dry powders having good storage stability. Further, the free-flowing characteristics of these products are retained during storage for periods of at least one year. The compositions can be generally characterized as capable of reconstitution simply by mixing with water to form stable aqueous paints substantially equivalent to a paint made up in liquid form originally. The compositions can be further specifically characterized by the properties of films cast from the reconstituted dispersions and air-dried, in that such films have good scrubbability, flexibility, and adhesion, and in addition have the improved brightness mentioned hereinbefore.

The present improved products may be obtained by drying the aqueous paint dispersions using a properly controlled continuous process of spray drying. As is common in such processes, the aqueous paint dispersion is disintegrated into fine particles by atomizing the same in a stream of air. The current of atomizing air should be of such high velocity relative to that of the stream of aqueous dispersion paint as to be capable of atomizing the paint into particles or globules consisting in large part substantially of the solid resin, pigment, pigment extender, thickener, or other water-insoluble constituents of the paint, with an envelope of the suspending medium (water with dispersing agent) about them.

This two-fluid atomization is well understood in the art, and it will be apparent that the relative velocities of the two fluids will be so chosen as to produce the requisite degree of disintegration of the paint dependent upon the sizes of the suspended particles in the paint. Where the original paint has a high solids content, say about 50 to 65%, it is desirable to dilute it to about 25 to 45% solids, with or without moderate preheating, say up to 140–150° F.

The drying temperature employed to prepare the powdered products of the present invention from an aqueous paint dispersion must be below the sintering temperature of the powdered article. More specifically, it has been found that this temperature can be above the sintering temperature of the resin binder in the paint but must be below that which will sinter the powder particle containing said resin binder along with the other solid constituents of the paint. This distinction is an important one because it permits the drying of the aqueous paint dispersions at substantially higher temperatures than heretofore employed for the spray-drying of aqueous compositions containing the same resin binders, e.g., emulsions, thereby achieving faster and more economical results. The utilization of drying temperatures above the sintering temperature of the resin binder for the aqueous paint dispersion is also surprising, since many of the compositions contain plasticizers and coalescing agents for said binder, the effect of which is to lower the sintering temperature of the binder.

A spray-drying apparatus suitable for the manufacture of the redispersible dry powdered paints in accordance with the present invention is illustrated on the attached drawing. The drier consists of a cylindrical shell or chamber 10, having a cone-shaped bottom section 11 connected through a cyclone separator 12 to an exhaust fan 13. At the top of the drier there is disposed an inlet for introducing heated drying air through a suitable conduit 14, and also a two-fluid nozzle 15 having a compressed air connection 16 and a conduit 17 for the supply of the aqueous paint dispersion. Also at the top of the drier is connected an air conduit 18 for supplying heated secondary air for the purpose of controlling the drying temperature above the sintering temperature of the resin binder in the paint. The "drying temperature" for the paint composition is the outlet air temperature of the drying air for lack of more accurate means for measurement of the temperature of the actual powdered paint particle.

The two-fluid nozzle can be of different types such as one to which the aqueous paint dispersion is charged at a pressure head of several feet. It can, however, also be of the type which draws the aqueous paint dispersion by suction. In the operation of the nozzle arrangement shown in the accompanying drawing, the liquid paint dispersion is introduced to the liquid nozzle centered in the air nozzle at a relatively low velocity, say about 10 feet per second, concurrently with a heated air stream of high velocity, say about 1000 feet per second, supplied to the air nozzle. The high velocity air stream actually picks drops off the liquid nozzle and disintegrates them to form very fine droplets.

Redispersible powdered paints were obtained with a commercial dried of the type above described having a drying chamber about 5 feet in diameter and about 10 feet high over a wide range of drying air temperatures. For paints having aqueous polyvinyl acetate resin binder, the primary inlet air temperatures varied between 200° and 500° F., and the outlet air temperatures varied between 190° and 250° F. For aqueous paint dispersions having certain other types of polyvinyl ester binders, for example, polyvinyl propionate, the maximum allowable outlet air temperatures would be higher because of the generally higher sintering temperatures of these resins, and in all cases, said maximum allowable outlet air temperatures would also be substantially above the sintering temperature for the resin binder itself. Realizing that outlet air temperatures above the sintering temperature of the resin binder itself can be employed, the best inlet and outlet air temperatures for a particular aqueous paint dispersion can be determined by simple experiment, the principal test being the redispersibility of the dried powder.

The invention will be described in more detail by reference to the following examples which disclosed some of its preferred formulations and procedures. The compositions shown are based on weight percent unless otherwise mentioned.

*Example 1*

| | |
|---|---|
| Pigment slurry: | |
| Pigment—titanium dioxide | 240 |
| Pigment extenders— | |
| Silica | 40 |
| Calcium silicate | 20 |
| Water | 270 |
| Dispersing agents— | |
| Tetrasodium pyrophosphate | 1 |
| Bentonite | 3.3 |
| Paint base: | |
| Binder—40% solids polyvinyl acetate emulsion substantially as taught in U.S. Patent 2,508,341 (Example 15) | 314 |
| Plasticizer—dibutyl phthalate | 25.9 |
| Solvent—hexylene glycol | 8.6 |
| Water | 19.5 |
| Thickener mixture: | |
| Water | 211 |
| Methyl cellulose (2% aqueous solution, 4000 cps.) | 5.7 |
| Defoamer—polypropylene glycol | 0.2 |
| Fungicide (Butrol) | 3.1 |
| Surfactant mixture: | |
| Solvents— | |
| Ethylene glycol | 3 |
| Ethylene glycol monoethyl ether | 7.0 |
| Dispersing agent—Sodium salt of carboxylated polyelectrolyte (Tamol 731) | 1.3 |
| Defoamer—Aliphatic substituted butynediols and octynediols (Surfynol 104W) | 0.4 |
| Surfactant—Alkyl phenyl polyethylene glycol ether | 0.3 |
| | 1174.3 |

The above liquid paint composition was formulated at room temperature by preparing the paint base and pigment slurry components separately, then mixing the components by combining them with agitation and subsequently passing the mixture through a Morehouse Mill to yield a stable uniformly fine particle size aqueous dispersion paint. Accordingly, the water, solvent, dispersing agent, thickener mixture, surfactant mixture, and bentonite constituents of the pigment slurry were first charged into a suitable vessel and while agitating this mixture the pigments and pigment extender constituents of the pigment slurry were sifted into the mixture and agitated for 20 minutes obtaining a lump-free, smooth mixture. The separate preparation of the paint base was accomplished by first mixing the solvent and plasticizer together, thereafter adding this mixture to the binder emulsion with rapid agitation and maintaining moderate agitation for 30 minutes. The paint base was then stirred into the pigment slurry and agitated for 30 minutes to yield a completely homogeneous mixture. The paint was passed once through a Morehouse Mill set at a one mil clearance to achieve the desired fineness of grind.

The above liquid paint composition was dried in a five foot diameter dryer of the general type described. The solids concentration of the paint was reduced to 39.8% before drying by mixing with water, in order to facilitate passage through the apparatus. The diluted liquid paint composition was charged to the two-fluid nozzle at a pressure head of several pounds per square inch. The primary air charged to the nozzle was under 6 pounds per square inch pressure. The temperature of the primary inlet air was approximately 220° F. and the secondary inlet air temperature was approximately 240° F. The rate of diluted paint feed was also controlled so as to aid in maintaining the outlet air temperature or drying temperature at approximately 190° F.

The product was a dry free-flowing powder that redispersed to give a paint comparable to the original. When applied the redispersed paint leveled well and the film, air-dried at room temperature, was flexible and possessed excellent brightness and scrubbability.

*Example 2*

An exterior white paint was prepared according to the method described in Example 1, having the following composition.

| | |
|---|---|
| Pigment slurry: | |
| Pigment slurry—titanium dioxide | 1180 |
| Pigment extenders— | |
| Silica dioxide | 100 |
| Calcium silicate | 100 |
| Water | 1300 |
| Dispersing agents— | |
| Tetrasodium pyrophosphate | 5 |
| Bentonite | 15 |
| Paint base: | |
| Binder—40% solids polyvinyl acetate emulsion substantially as taught in U.S. Patent 2,508,341 (Example 15) | 1365 |
| Plasticizer—dibutyl phthalate | 112.3 |
| Solvent—hexylene glycol | 37.4 |
| Water | 85.3 |
| Thickener mixture: | |
| Water | 1007 |
| Carboxymethyl cellulose (2% aqueous solution 4000 cps.) | 26.2 |
| Defoamer—polypropylene glycol | 1.0 |
| Fungicide (Butrol) | 15.7 |
| Surfactant mixture: | |
| Solvent—ethylene glycol | 14.7 |
| Dispersing agent—sodium salt of carboxylated polyelectrolyte (Tamol 731) | 6.7 |
| Defoamer—aliphatic substituted butynediols and octynediols (Surfynol 104W) | 2 |
| Surfactants—alkyl phenyl polyethylene glycol ether | 1.6 |
| | 5375 |

The above liquid composition was spray-dried as in Example 1. The drying conditions were the same as those used in that example, except that the feed solids were 26.4%. The products produced a good paint having properties comparable to that obtained from the product in Example 1.

Example 3

An interior white paint comprising a polyvinyl acetate resin binder was prepared according to the method described in Example 1, having the following composition:

Paint base:
| | |
|---|---:|
| Plasticizer—dibutyl phthalate | 20 |
| Solvents— | |
|     Hexylene glycol | 10 |
|     Ethylene blycol | 35 |
| Water | 15 |
| Surfactant—alkyl, aryl sodium sulfonate (Santomerse No. 3) | 2 |
| Binder—40% solids content polyvinyl acetate emulsion substantially as taught in U.S. Patent 2,444,396 (Example B) | 243 |

Pigment slurry:
| | |
|---|---:|
| Water | 215 |
| Thickener—methyl cellulose (2% aqueous solution, 400 cps.) | 190 |
| Dispersing agent—sodium salt of carboxylated polyelectrolyte (Tamol 731) | 20 |
| Pigment—titanium dioxide | 225 |
| Pigment extenders— | |
|     Clay | 62 |
|     Calcium silicate | 50 |
|     Calcium carbonate | 61 |
| | 1148 |

The above composition was spray-dried substantially according to the method described in Example 1. The drying conditions were a primary air temperature of 224° F., a secondary air temperature of 222° F., and an outlet air temperature of 192° F. The feed concentration was 34.6% solids. A free-flowing powder was obtained which was equivalent to the original liquid paint composition upon redispersion.

Example 4

An interior white paint comprising as the resin binder the copolymer of vinyl acetate and dibutyl maleate was prepared according to the usual methods, having the following compositions.

Paint base:
| | |
|---|---:|
| Binder—55% total solids aqueous emulsion of the copolymer comprising 75 parts by weight of the coplymer of vinyl acetate with 25 parts by weight of dibutyl maleate | 243 |
| Plasticizer—dibutyl phthalate | 20 |
| Solvents— | |
|     Hexylene glycol | 15 |
|     Ethylene glycol | 25 |
| Water | 15 |

Pigment slurry:
| | |
|---|---:|
| Water | 201 |
| Dispersing agents— | |
|     Sodium salt of polycarboxylated condensed naphthalene (Tamol 731) | 5 |
|     Block copolymer of ethylene oxide-propylene oxide (Pluronic 162) | 2 |
| Thickener—methyl cellulose (2% aqueous solution, 4000 cps.) | 200 |
| Pigment—titanium dioxide | 149 |
| Pigment extenders— | |
|     Clay | 109 |
|     Calcium silicate | 50 |
|     Calcium carbonate | 61 |
| | 1095 |

The above composition was spray-dried according to the method described in Example 1. The drying temperatures used were the primary at 224° F., the secondary at 222° F., and the outlet at 192° F. Feed concentration was 48.5% solids. The dry powdered product was equivalent to the original liquid composition upon reconstitution.

The powdered paints produced by the method of the present invention have a moisture content of no more than 4% by weight which upper limit is critical to insure freedom from caking during storage and the consequent loss of the redispersibility characteristic. The powdered paints comprise discrete powder particles each containing a relatively large number of individual resin binder particles having a size in the order of 0.05 to 8 microns and being separated by the non-resinous solids of the aqueous paint dispersion. These products can be prepared from aqueous paint dispersions having a solids composition comprising about 20 to 80% by weight of a film-forming polymer from the group consisting of polyvinyl esters of organic acids containing up to 7 carbon atoms, about 80 to 20% by weight of a pigment and extends therefore, about 0.5 to 5% by weight of a thickener, and about 0.05 to 1.0 by weight of a dispersing agent. Optionally the aqueous paint dispersion can contain from about 5 to 20% by weight of the film-forming polymer of plasticizers and coalescing agents therefor. The composition of a substantial portion of the individual powder particles is representative of the solids composition of the paint.

Nor is it intended to limit useful vinyl ester resin binders to homopolymers. Useful vinyl ester resin binders include homopolymers of vinyl propionate, vinyl butyrate, vinyl hexoate, vinyl benzoate and the like as well as copolymers of vinyl esters with monoethylenically unsaturated monomers which are copolymerizable therewith, including other vinyl esters; the lower alkyl esters of acrylic acid, such as methyl acrylate, propyl acrylate, hexyl acrylate, octyl acrylate, and the like; lower alkyl esters of methacrylate acid such as methyl methacrylate, ethyl methacrylate, propyl methacrylate, butyl methacrylate, hexyl methacrylate, octyl methacrylate and the like; carboxylic acids such as acrylic acid, methacrylic acid, crotonic acid, and the like; and others.

The useful pigments are characterized as being dispersible but not soluble in water, and generally not chemically reactive with the other constituents in the composition. Certain reactive pigments are suitable where there is a very limited reactivity. Such reactivity can be limited to those useful to control pH. The optimum particle size of the pigment is 0.4 micron average diameter. When the pigment particle diameter exceeds approximately 2 microns, there is difficulty in dispersing the pigment. The useful extenders may be characterized as having the same physical and chemical properties as the pigment with the exception that they possess low hiding power. Their chief advantage is an economic one; namely, that of raising pigment-volume-concentration (P.V.C.) without increasing the cost substantially. Although the composition of the invention which can be spray-dried can tolerate a certain amount of reactivity of the pigment, suitable extenders are essentially those which are non-reactive. Pigments and pigment extenders are well known in the paint art and their function is mainly that of inert agents in the film compositions serving essentially as opacifiers, colorants, body agents, and the like.

Suitable prime pigments are, for example, rutile titanium dioxides.

Preferred pigments which are found to give good results are the so-called "water-dispersible" grades of pigment.

The preferred extender type pigments are clays, micas, silicas, and talcs. It is preferable that the dried type be employed; for example, dried ground mica is better than the water-ground type. Calcium carbonate while employable is not preferred but a mixed product of calcium carbonate, aluminum silicate, and magnesium silicate, is preferred.

Extenders which may be employed include the following: calcium silicates, particularly "Wollastonite P-4," clays, particularly those sold under trademark names "ASP," "Hydrite"; micas, particularly water-ground mica, sold under the proprietary name "Alsibronz No. 12," and dried-ground mica sold under the trademark name "Mineralite 3X"; silicas, particularly the product sold under the trademark names "Celite," "Gold Bond R," "Hi Sil 233"; and talc, particularly those sold under the trademark names "Nytal 300," and "HGO-55."

It is preferred when using pigments and/or extenders that these agents not exceed 2 microns average diameter, in order to give a smooth appearance to the film.

Useful thickeners or stabilizers, as they are sometimes called, can best be defined by their function in the liquid dispersions from which the dry powders are obtained. The primary purpose of the thickener in the dispersion is to increase the viscosity of the water phase in the dispersion.

Useful thickeners can be selected from the class of hydrophilic colloids generally, but may include finely divided inert particulate solids. For example, preferred thickeners are of the finely divided silica and borated alginate types, although cellulosics such as carboxymethylcellulose may also be employed. Examples of the types of thickeners which are effective are methyl cellulose, sold under the name "Methocel," carboxymethylcellulose, sold under the brand name "CMC, Type 70, LV," hydroxyethylcellulose, sold under the name "Cellosize WP-09," low viscosity, partially hydrolyzed, polyvinyl alcohol, sold under the name "Gelvatol 40-10," borated alginate, sold under the name "Burtonite X-90," guar gum, sold under the name "Burtonite No. 7," methylated guar gum, sold under the name "Burtonite No. 77," and silica, sold under the name "Hi Sil 233."

As plasticizers which may be employed for the resin binders shown in the preceding examples there may be employed any of the liquid plasticizers for vinyl ester polymer dispersions, for example, such organic compounds as phthalate esters, phosphate esters, chlorinated biphenyls, and citrate esters. Furthermore, useful organic compounds also include polymeric materials as for example, water-dispersible liquid polyesters. In general, the suitable plastizers may be selected from the class of water-immiscible organic plasticizer materials which are compatible with vinyl ester polymer dispersions.

The coalescing agents which were illustrated in the preceding examples are well known in the art. They are also known by the terms filming agents and conditioning agents. The preferred class of coalescing agents are water-soluble and can be selected from the class of glycols, glycol ethers, and esters of glycol ethers including hexylene glycol, ethylene glycol, diethylene glycol monoethyl ether (sold under the trademark name "Carbitol"), ethylene glycol monoethyl ether (sold under the name "Cellosolve"), propylene glycol, "Cellosolve" acetate, butyl "Carbitol" acetate, and the like. The class of suitable coalescing agents can be selected from the general class of solvents for the resinous binder and can be more specifically characterized as those which are water-immiscible and compatible with aqueous dispersions of the resinous binder so that the resin particles are not precipitated by addition of the solvent. Suitable coalescing agents may be further characterized as those which are sufficiently non-volatile so as to remain present in the dry powdered mixture during the entire storage period and for a reasonable period after redispersion of the mixture of the wet film.

The dispersing agents which are suitable in the present compositions can be selected from the general class of organic water-soluble surfactants which have good dispersing properties and which are compatible with the resin binder. Useful dispersing agents include the nonionic type, for example, the block copolymer of ethylene oxide-propylene oxide, available commercially by the trademark "Pluronic L62," the anionic type, for example, the dioctyl ester of sodium sulfosuccinc acid, available commercially under the trademark "Aerosol OT," and the sodium salt of a polycarboxylated condensed naphthalene, available commercially as "Tamol 731" and the cationic type, for example, tertiary amines, particularly a trade marked product known as "Ethomeen C15," which has alkyl groups derived from coco amine, contains 5 ethylene oxide units and has a molecular weight average of 437.

It is not intended to limit the present invention exclusively to the spray-drying of the compositions disclosed in the above examples. It will be obvious to the man skilled in the art that other powdered paint compositions can be obtained by the practice of the invention for example, in addition to such optional constituents for paints as the plasticizers, coalescing agents, fungicides, and preservatives shown in the preceding examples, it is also possible to modify the original liquid compositions by the incorporation of other additives so as to obtain desired properties in the dried films obtained from the redispersions and still be able to spray the original liquid composition. Hence, inert materials such as sand and other texturing agents may be incorporated into the original liquid dispersion in order that the redispersion may be used as a texture finish. It is also not intended to limit the products of the present invention to paint applications merely. It is obvious that dry powders of the present invention can be used as patching compounds merely by controlling the amount of water added during reconstitution.

What is claimed is:

A free flowing spray dried powder produced by spray drying an aqueous paint dispersion, said powder being reconstitutable to the aqueous paint dispersion by dispersing in water, and said powder comprising, in parts by weight:
(a) 134 parts copolymer of vinyl acetate with dibutyl maleate in a 75 to 25 weight ratio
(b) 149 parts titanium oxide pigment, and pigment extenders consisting of 109 parts clay, 50 parts calcium silicate and 61 parts calcium carbonate
(c) 4 parts methyl cellulose thickener
(d) dispersing agent consisting of 5 parts sodium salt of polycarboxylated condensed naphthalene and 2 parts block copolymer of ethylene oxide-propylene oxide
(e) 20 parts dibutyl phthalate plasticizer.

References Cited by the Examiner

UNITED STATES PATENTS

| | | | |
|---|---|---|---|
| 2,592,510 | 4/1952 | Casebolt | 260—851 |
| 2,733,995 | 2/1956 | Robinson | 260—41 |
| 2,800,463 | 7/1957 | Morrison | 260—29.6 |
| 3,104,234 | 9/1963 | Bray | 260—17.4 |

WILLIAM H. SHORT, *Primary Examiner.*

JAMES A. SEIDLECK, LOUISE P. QUAST, *Examiners.*

J. NORRIS, *Assistant Examiner.*